2,945,060

PROCESS FOR GLUTARIC ACID MANUFACTURE

James C. Martin and Robert H. Hasek, Kingsport, Tenn., assignors to Eastman Kodak Company, Rochester, N.Y., a corporation of New Jersey No Drawing. Filed May 16, 1957, Ser. No. 659,463

5 Claims. (Cl. 260—537)

This invention relates to a novel and improved process for preparing aliphatic dicarboxylic acids. In a specific aspect this invention relates to a novel and improved process for producing glutaric acid.

Aliphatic dicarboxylic acids such as glutaric acid are susceptible of a variety of uses. For example, glutaric acid can be used in the production of polyurethane rubbers and in this respect it is reported to be somewhat superior to succinic acid and adipic acid. Also glutaric acid can be used to form esters such as the bis (3,5,5-trimethylhexyl) ester which can be used as a turbojet lubricant. Other esters of glutaric acid have been found to be useful as general purpose lubricants. Also, linear polyesters, for example the polyesters derived from 4,4'-sulfonyldibenzoic acid and various glycols, when modified with glutaric acid show desirable properties such as the imparting of greater elasticity to various fibers. Such linear polyesters have also been found useful in preparing plastics and films.

Glutaric acid has been prepared commercially by the reaction of methyl vinyl ether with acrolein to produce 3,4-dihydro-2-methoxy-2H-pyran which is hydrolyzed to glutaraldehyde and the resulting product is oxidized to glutaric acid. Other methods for producing glutaric acid are known but all of these methods, including the commercial procedures, are inferior to the process of this invention.

We have found that glutaric acid can be produced in good yields by reacting crotonic acid with carbon monoxide and hydrogen in the presence of a cobalt catalyst to form glutaraldehydic acid and then contacting resulting reaction mixture with oxygen to oxidize the glutaraldehydic acid to glutaric acid.

The following examples are illustrative of the invention:

Example 1

150 g. (1.75 moles) of crotonic acid, 500 ml. benzene, and 8 g. cobalt carbonyl were charged into a 1-liter, stainless steel, rocking autoclave, pressurized with a 1:1 mixture of CO and $H_2$ to 2000 p.s.i., and then heated to 145° C. with rocking. Reaction set in and was complete in about 1 hour. After cooling and releasing the pressure, the contents of the autoclave were immediately transferred to an oxidation column. 2 g. of cobalt stearate was added and oxidation was accomplished by passing in air at the bottom of the column at 65° C. for 16 hours. The reaction mixture was first stripped of solvent and then vacuum distilled to give 160.3 g. of a product with a boiling point of 125–160° of 0.4 mm. This material on analysis was found to consist of 15.1% glutaric anhydride and 78.3% glutaric acid. The overall yield of these materials was 66%. Glutaric acid can be separated as white crystals by a single recrystallization from benzene. It had a melting point of 97–98° C. and: Neutralization equivalent (theoretical) 66.0; (found) 66.2. The anhydride can be recovered by evaporating the benzene recrystallization solution.

Example 2

150 g. (1.75 moles) of crotonic acid, 500 ml. acetic acid, 2 g. of cobalt carbonyl, and 2 g. of cobalt acetate were charged into a 1-liter, stainless steel, rocking autoclave, pressurized with a 1:1 mixture of carbon monoxide and hydrogen to 1500 p.s.i., and then heated to 140° C. with rocking. Pressure was adjusted to 3000 p.s.i., and the reaction was complete in about 90 minutes. The reaction mixture was cooled and the autoclave vented. The autoclave was then purged twice with air, then pressurized to 200 p.s.i. with air, and heated to 70° C. for 2 hours. This was vented and repressurized with air and heated to 70° C. for 4 hours. The contents of the autoclave were distilled to give 150 g. of a product with a boiling point of 130–165°/0.6 mm. This was a mixture of glutaric acid and glutaric anhydride.

The process of this invention can be carried out using a variety of solvents. The solvent should be one that is unaffected by the oxidation conditions and one that is inert to the reaction products. Among the solvents that can be used are the normally liquid hydrocarbons. Aliphatic hydrocarbons such as hexane, heptane, octane and the like can be used but the preferred solvents are the aromatic hydrocarbons such as benzene, toluene, the xylenes and the like. Additionally other solvents such as naphtha, acetic acid, dioxane, lower aliphatic ethers, such as diethyl ether, and esters, such as ethyl acetate, can also be used.

The catalyst that is employed in the first step of our process is a cobalt catalyst which can be in the form of cobalt carbonyl or is capable of forming cobalt carbonyl during the reaction. Cobalt itself or a cobalt salt such as cobalt acetate can be used and in some instances it is found desirable to employ the cobalt catalyst along with other materials such as thoria and magnesia which may be deposited on a carrier such as kieselguhr. For the reaction the cobalt is ordinarily in the form of a cobalt carbonyl such as cobalt tetracarbonyl and cobalt hydrocarbonyl.

During the first step of our process an aldehyde group is added to the crotonic acid. Prior to the addition of the aldehyde group to the crotonic acid a shifting of the double bond occurs to the terminal carbon atom and the aldehyde group then adds to the terminal carbon atom producing gamma-formylation. The result of this reaction is the production of glutaraldehydic acid. The temperature at which this step of the process is carried out is quite important and it ordinarily will be within the range of 120 to 170° C. At lower temperatures very little reaction occurs and at temperatures above this range hydrogenation of the aldehyde formed during the reaction takes place to form the corresponding alcohol. For this step of the process the pressure is ordinarily within the range of 1,000 to 15,000 p.s.i. with the higher pressures being preferred.

The reaction mixture resulting from the first step of our process is then contacted with oxygen or an oxygen containing gas such as air to oxidize the glutaraldehydic acid to glutaric acid. In this step of the process the oxidation reaction is usually carried out at a temperature within the range of 30 to 80° C. At temperatures above this range some oxidative cleavage of the carbon chain takes place to produce succinic acid and oxalic acid as by-products of the process. It is unnecessary to add any oxidation catalysts to the reaction mixture for this reaction but if desired soluble cobalt salts such as cobalt stearate can be employed.

It is particularly important in practicing our invention to employ the reaction mixture from the first step of our process in the oxidation reaction for the second step of our process. The importance of doing so will be apparent from the specific examples. We have found that if glutaraldehydic acid is separated from the first stage reaction mixture and then oxidized to glutaric acid only comparatively small amounts of glutaric acid are produced. On the other hand, when the glutaraldehyde acid is oxidized to glutaric acid in the reaction mixture from the first stage of our process considerably greater yields of glutaric acid are obtained. It should be noted that in Examples 1 and 2 overall yields are glutaric acid of about 66% were obtained. However, when glutaraldehydic acid was separated from the first stage reaction mixture, yields of less than 20% of said acid were obtained. This fact is demonstrated by the following example:

Example 3

100 g. (1.16 moles) of crotonic acid, 500 ml. of benzene, and 6.0 g. of cobalt carbonyl were charged into a 1-liter, stainless steel, rocking autoclave, pressurized with a 1:1 mixture of CO and $H_2$ to 2000 p.s.i., and then heated to 145° with rocking. Reaction set in and was complete in about 1 hour. After cooling and releasing the pressure, the reaction mixture was stripped of benzene at room temperature under vacuum. The residue was then flash distilled to separate the product from the cobalt catalyst. The distillate was redistilled to give 26.4 g. of material with a boiling point of 100–104° at 1.5 mm. The product had the following analysis:

(Theoretical for glutaraldehydic acid):
 Percent C, 51.7; (found) 51.83
 Percent H, 6.9; (found) 7.06.

A yield of 19.6% of glutaraldehydic acid was obtained.

The product changed to the solid trimer upon standing overnight.

We claim:

1. The process for producing glutaric acid which comprises reacting crotonic acid with carbon monoxide and hydrogen in the presence of a cobalt catalyst at a temperature of 120–170° C. and a pressure of 1000–15,000 p.s.i. to form glutaraldehydic acid and contacting resulting reaction mixture with oxygen at a temperature of 30–80° C. to oxidize said glutaraldehydic acid to glutaric acid.

2. The process according to claim 1 wherein the cobalt catalyst is cobalt carbonyl.

3. The process according to claim 1 wherein benzene is used as a solvent in the process.

4. The process according to claim 1 wherein acetic acid is used as a solvent in the process.

5. The process according to claim 1 wherein cobalt stearate is added to the first step reaction mixture to catalyze the second step oxidation reaction.

References Cited in the file of this patent
UNITED STATES PATENTS

| | | |
|---|---|---|
| 2,553,364 | Fasce | May 15, 1951 |
| 2,798,093 | Stein | July 2, 1957 |
| 2,801,263 | Hasek et al. | July 30, 1957 |
| 2,817,669 | Bowditch et al. | Dec. 24, 1957 |
| 2,820,820 | Montagna et al. | Jan. 21, 1958 |
| 2,820,821 | Guest et al. | Jan. 21, 1958 |

OTHER REFERENCES

Adkins et al.: JACS, vol. 71 (1949), pages 3051–5.